(12) United States Patent
Valliappan et al.

(10) Patent No.: US 11,899,745 B1
(45) Date of Patent: Feb. 13, 2024

(54) SYSTEMS AND METHODS FOR SPEECH OR TEXT PROCESSING USING MATRIX OPERATIONS

(71) Applicant: Meta Platforms Technologies, LLC, Menlo Park, CA (US)

(72) Inventors: Alagappan Valliappan, Redmond, WA (US); Ganesh Venkatesh, San Jose, CA (US); Pierce I-Jen Chuang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 758 days.

(21) Appl. No.: 16/997,401

(22) Filed: Aug. 19, 2020

(51) Int. Cl.
    *G06F 17/16*    (2006.01)
    *G06F 7/544*    (2006.01)

(52) U.S. Cl.
    CPC ............ *G06F 17/16* (2013.01); *G06F 7/5443* (2013.01)

(58) Field of Classification Search
    CPC ........ G06F 17/15; G06F 17/153; G06F 17/16; G06F 7/523; G06F 7/5443; G06F 7/4876; G06F 7/52; G06F 7/57; G06F 7/483; G06F 7/487; G06F 7/5057; G06F 7/4983; G06F 7/4988; G06F 1/03; G06N 3/04; G06N 3/063; G06N 3/08
See application file for complete search history.

(56) References Cited

U.S. PATENT DOCUMENTS

| | | | |
|---|---|---|---|
| 8,924,455 B1* | 12/2014 | Barman | G06F 7/5443 708/607 |
| 2019/0147327 A1* | 5/2019 | Martin | G06N 3/063 706/15 |
| 2019/0339944 A1* | 11/2019 | Olsen | G06F 17/15 |
| 2020/0160161 A1* | 5/2020 | Yoo | G06N 3/044 |
| 2021/0271451 A1* | 9/2021 | Nair | G06F 17/16 |
| 2021/0271981 A1* | 9/2021 | Lee | G06N 3/063 |
| 2021/0357475 A1* | 11/2021 | Wang | G06F 7/4876 |
| 2021/0365747 A1* | 11/2021 | Krishnamoorthy | G06F 18/21 |
| 2022/0326912 A1* | 10/2022 | Hong | G06F 7/5443 |

\* cited by examiner

*Primary Examiner* — Matthew D Sandifer
*Assistant Examiner* — Huy Duong
(74) *Attorney, Agent, or Firm* — Foley & Lardner LLP

(57) ABSTRACT

Disclosed herein includes a system, a method, and a device for processing and converting data using matrix operations. Circuitry can partition an input of a first data format across a plurality of lookup tables each residing in a respective memory. The circuitry can access weight information from a load store memory, and the partitioned input on a per column basis from the plurality of lookup tables. The circuitry can perform a number of multiply-accumulate (MAC) operations per cycle between the weight information from the load store memory and the partitioned input read on a per column basis from the plurality of lookup tables. The number of MAC operations performed per cycle can correspond to a total number of columns of the plurality of lookup tables. The circuitry can generate, responsive to the MAC operations on the partitioned input, a plurality of outputs in a second data format.

20 Claims, 7 Drawing Sheets

SYSTEMS AND METHODS FOR SPEECH OR TEXT PROCESSING USING MATRIX OPERATIONS

FIELD OF DISCLOSURE

The present disclosure is generally related to handling of data of a neural network, including but not limited to systems and methods for processing speech data or text data using matrix operations.

BACKGROUND

Computer systems can include a memory or memory component to store and maintain data. The memory or processor coupled to the memory can store and retrieve information and data through write and read operations. However, each time the memory system is accessed, the computer system utilizes various resources and various levels of power consumption to store or retrieve information and data.

SUMMARY

Devices, systems and methods for processing data using matrix operations are provided herein. A device including the circuitry can partition the data across lookup tables of a plurality of memory to increase a speed of computation, processing and reduce power consumption by a processor of the device during general matrix multiply operations (GEMM) to convert the data from the first data format to the second data format (e.g., text to speech for on-device machine learning applications). The circuitry and hardware components forming the circuitry can be connected and designed to increase an efficiency of incorporating or modifying software components to the circuitry, for example, to modify the speed of computation, processing or power consumption by the processor of the device. The data can include speech data, text data, audio data and/or video data and can be processed by the circuitry to convert the respective data from a first data format to a second, different data format (e.g., speech to text conversion, text to speech conversion) using matrix operations.

The device can include an integrated circuit. The integrated circuit can include a processor having a plurality of multiply-accumulate (MAC) units, a load store memory and a plurality of memory each including a lookup table. The integrated circuit can include hardware for performing an adder function and quantization. In some embodiments, one or more memory banks can be connected to the load store memory (e.g., load store units). The plurality of memory can be connected and accessed in parallel with the processor and load store memory. The data can be partitioned across the lookup tables of the memory such that an input is spread across individual columns of the respective lookup tables. The circuitry can read or access weight information from the load store memory and the partitioned input from individual columns of the lookup tables, for example, in parallel and on a per column basis and provide the weight information and partitioned input to a plurality of MAC units. The MAC units can perform MAC operations between the weight information and partitioned input from the individual columns. The device can increase and control the speed of computation and processing of the partitioned data using the columns of the lookup tables to accelerate a number of matrix multiply operations performed per cycle. For example, the number of MAC operations performed per cycle can be controlled based in part on a total number of columns of the lookup tables. In some embodiments, the number of MAC operations performed per cycle can be equal to a product of the total number of columns of the plurality of lookup tables and a number of elements maintained in the load store memory.

In at least one aspect, a method is provided. The method can include partitioning, by circuitry, an input of a first data format across a plurality of lookup tables each residing in a respective memory. The method can include accessing, by the circuitry, weight information from a load store memory, and the partitioned input on a per column basis from the plurality of lookup tables. The method can include performing, by the circuitry, a number of multiply-accumulate (MAC) operations per cycle between the weight information from the load store memory and the partitioned input read on a per column basis from the plurality of lookup tables. The number of MAC operations performed per cycle can correspond to a total number of columns of the plurality of lookup tables. The method can include generating, by the circuitry responsive to the MAC operations on the partitioned input, a plurality of outputs in a second data format.

In embodiments, the first data format includes at least one of: text, audio, image or video. The method can include writing, by the circuitry, the plurality of outputs to a plurality of registers. The outputs associated with each column of the plurality of lookup tables can be stored in one or more registers of the plurality of registers. The number of MAC operations performed per cycle can be equal to a product of the total number of columns of the plurality of lookup tables and a number of elements maintained in the load store memory. The method can include performing, by the circuitry, matrix multiplication using the weight information from the load store memory and the partitioned input read from individual columns of the plurality of lookup tables.

The method can include combining, by the circuitry, one or more outputs associated with a column of a first lookup table of the plurality of lookup tables, with one or more previous outputs for the column of the first lookup table in a register. The method can include performing, by the circuitry, quantization on the plurality of outputs prior to storing the outputs in a plurality of registers. The method can include preprocessing, by the circuitry, first data into vector form prior to partitioning the input, the preprocessed first data being the input. In embodiments, the load store memory, the plurality of memory and the circuitry can reside within an integrated circuit. The method can include processing, by the circuitry after quantization, the plurality of outputs to a third data format, the third data format comprising at least one of: text, speech, audio or video. In embodiments, a bus width of the load store memory can be a function of a number of elements maintained in the load store memory and a number of bits of each element. In some embodiments, the size and bus width of the load store memory and the width or each of the elements in the memory can determine the number of MAC operations performed per cycle.

In at least one aspect, an integrated circuit is provided. The integrated circuit can include a processor having a plurality of multiply-accumulate (MAC) units. The integrated circuit can include a load store memory connected to the processor. The integrated circuit can include a plurality of memory each comprising a lookup table. The plurality of memory can be connected in parallel to the processor. The processor can be configured to partition an input of a first data format across a plurality of lookup tables each residing in a respective memory. The processor can be configured to read weight information from a load store memory and the partitioned input on a per column basis from the plurality of lookup tables. The processor can be configured to perform a number of multiply-accumulate (MAC) operations per cycle between the weight information from the load store memory and the partitioned input read on a per column basis from the plurality of lookup tables. The number of MAC operations performed per cycle can correspond to a total number of columns of the plurality of lookup tables and the number of elements read from the load store memory. The processor can be configured to generate, responsive to the MAC operations on the partitioned input, a plurality of outputs in a second data format.

In embodiments, the first data format includes at least one of: text, audio, image or video. The processor can be configured to write the plurality of outputs to a plurality of registers. The outputs associated with each column of the plurality of lookup tables can be stored in individual registers of the plurality of registers. The number of MAC operations performed per cycle can be equal to a product of the total number of columns of the plurality of lookup tables and a number of elements maintained (e.g., accessed, fetched) in the load store memory. The processor can be configured to perform matrix multiplication using the weight information from the load store memory and the partitioned input read from individual columns of the plurality of lookup tables.

In embodiments, the processor can be configured to combine one or more outputs associated with a column of a first lookup table of the plurality of lookup tables, with one or more previous outputs for the column of the first lookup table in a register. The processor can be configured to perform quantization on the plurality of outputs prior to storing the outputs in a plurality of registers. The processor can be configured to preprocess first data into vector form prior to partitioning the input, the preprocessed first data being the input. The processor can be configured to process, after quantization, the plurality of outputs to a third data format, the third data format comprising at least one of: text, speech, audio or video.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for processing and converting data using matrix operations.

A. Environment for Artificial Intelligence related Processing

Figure 1A:
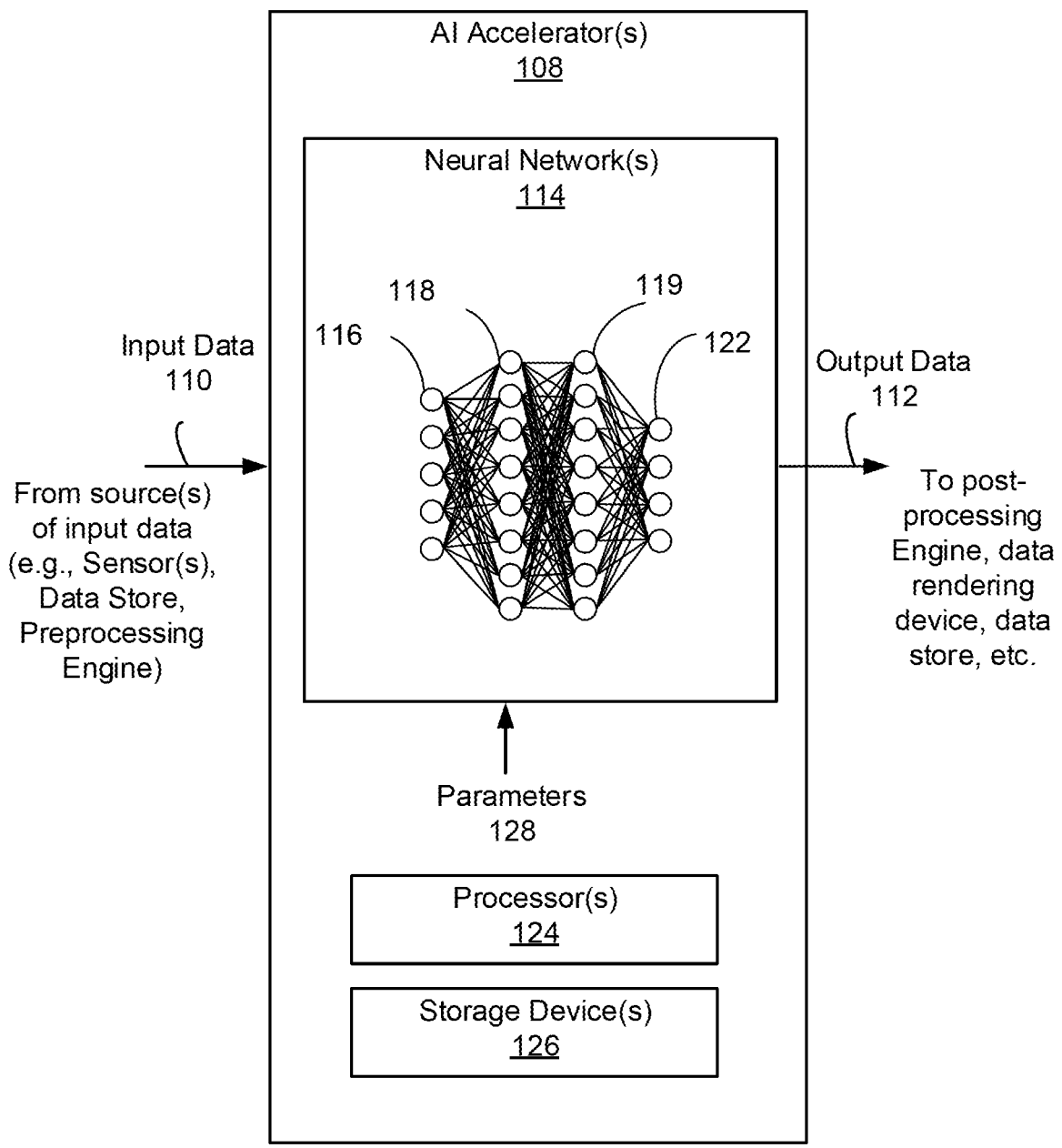
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) and/or one or more storage devices 12.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing the neural network using architectures for that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 114 differently for each neural network 114, or assigning different weights (e.g., hyperparameters, or learning rates), tensor flows, etc. Thus, by setting appropriate parameters 128 for the neural network(s) 114 based on a tuning or training process and the objective of the neural network(s) and/or the system, this can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represents some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduces the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers.

Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108), sequential processing (e.g., on the same component of an AI accelerator 108, at different times), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics, internet of things and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
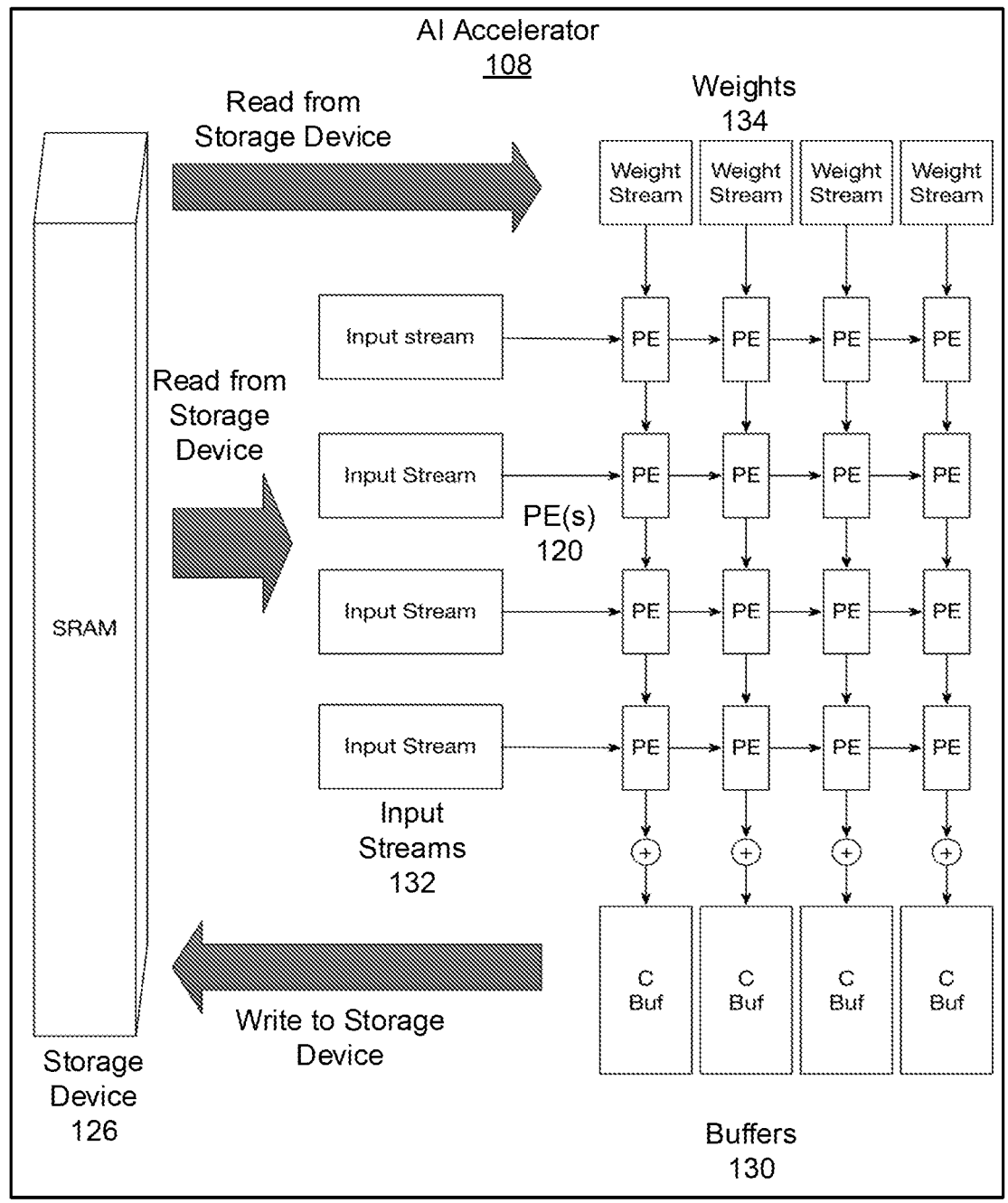
FIG. 1B is a block diagrams of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The PEs are connected into a particular network pattern or array, with different patterns serving different functional purposes. The PE in an artificial neural network operate electrically (e.g., in a semiconductor implementation), and may be either analog, digital, or a hybrid. To parallel the effect of a biological synapse, the connections between PEs can be assigned multiplicative weights, which can be calibrated or "trained" to produce the proper system output.

PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some network networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

Referring again to FIG. 1B, the input x to a PE 120 can be part of an input stream 132 that is read from a storage device 126 (e.g., SRAM). An input stream 132 can be directed to one row (horizontal bank or group) of PEs, and can be shared across one or more of the PEs, or partitioned into data portions (overlapping or non-overlapping portions) as inputs for respective PEs. Weights 134 (or weight information) in a weight stream 134 (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE, or routed through one or more PEs (e.g., along a row or column of PEs) to the target PE. The output of each PE can be routed directly out of the PE array, or through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored to the storage device 126 can be retrieved or read from the storage device 126, and be used as inputs to the array of PEs 120 for processing (of a subsequent layer of the neural network) at a later time. In certain embodiments, the outputs that are stored to the storage device 126 can be retrieved or read from the storage device 126 as output data 112 for the AI accelerator 108.

Figure 1C:
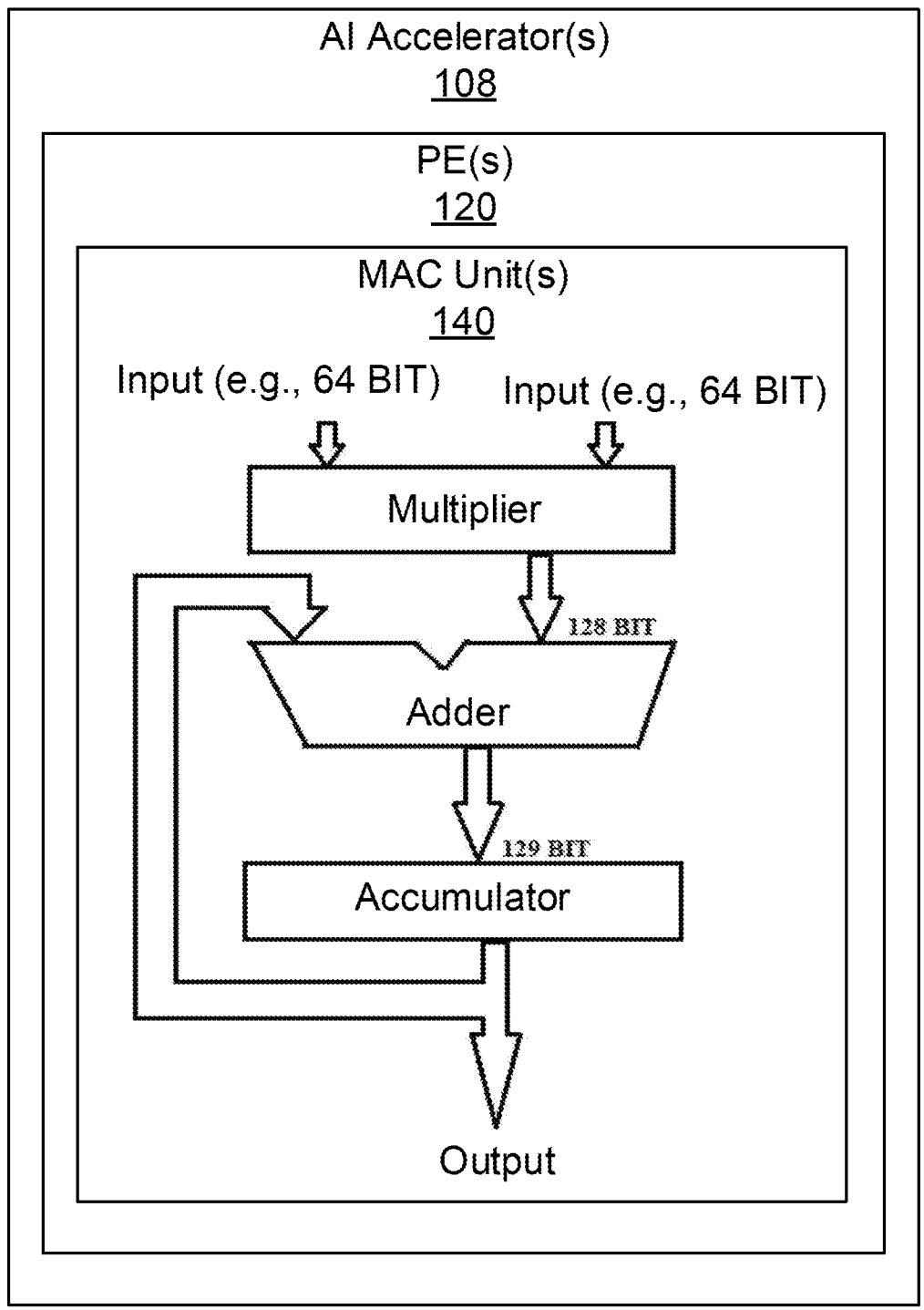
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to as a MAC engine. A MAC unit is configured to perform multiply—accumulate operation(s). The MAC unit can include a multiplier circuit, an adder circuit and/or an accumulator circuit. The multiply—accumulate operation computes the product of two numbers and adds that product to an accumulator. The MAC operation can be represented as follows, in connection with an accumulator a, and inputs b and c:

$$a \leftarrow a + (b \times c) \quad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator.

Figure 1D:
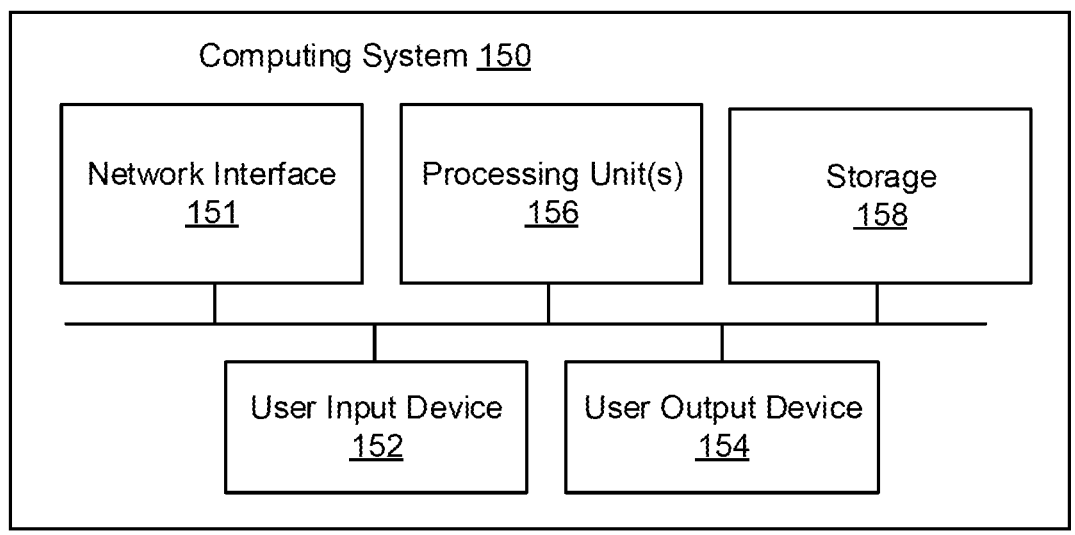
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 154 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Processing and Converting Data using Matrix Operations Disclosed herein include embodiments of a system, a method and a device to increase speed of computation and/or reduce power consumption by a processor of a device to perform general matrix multiply operations (GEMM) for applications including, but not limited to, text to speech conversion and speech to text conversion. A device including the circuitry can partition the data across lookup tables of a plurality of memory to increase the speed of computation, processing and reduce power consumption by a processor based in part on a number of columns of the lookup tables. The techniques can leverage the sparsity of the data (e.g., text data, audio data, video data) and a hardware design of the device to increase the speed computation or conversation of the data from a first data format to a second data format (e.g., text to speech for machine learning applications).

The conversion of text data to speech data or from speech data to text data can use GEMM (e.g., matrix multiplies) and multiplier-accumulator (MAC) operations (e.g., matrix-vector operations). However, the speed of the conversion can be limited by the number of MAC operations a processor can perform in per cycle and based in part on an architecture or design of the processor hardware performing the operations. The techniques described herein can include a device hardware design having multiple lookup tables and connected in parallel with a load store memory (e.g., digital signal processor, data tightly coupled memory) of a processor to increase a number of MAC operations performed per cycle by the device and reduce a power consumption by the device during conversion of data. The device can include multiple MAC units to receive elements or data from the load store memory and partitioned input from columns of the lookup tables and perform matrix multiply operations between the data from the load store memory and the columns of the lookup tables. The matrix-multiply operations can be compute bound and the matrix-vector operations can be bandwidth bound. The techniques described herein can store and partition the values of at least one operand across the lookup tables to reduce bandwidth needs by a factor based in part on the number of lookup tables used (e.g., reduce bandwidth needs by half, 50%). For example, the received data samples (e.g., text data, audio data) can be preprocessed and loaded into or across the multiple lookup tables. In some embodiments, the received data samples can be preloaded into multiple lookup tables (e.g., four lookup tables) with each lookup table including two columns of sixteen elements.

The device can perform matrix multiply operations between the matrix of values in the load store memory and the matrix of values for individual columns of the lookup tables. The device can retrieve elements (e.g., weight information) from the load store memory and elements from individual columns of the lookup tables on a per column basis. The device or MAC units of the device can perform MAC operations between the retrieved elements from the load store memory and elements retrieved from the columns of the lookup tables. In some embodiments, the device can retrieve 16 elements at a time from the load store memory and 16 elements from a column of each lookup table such that the device performs MAC operations between the elements from the load store memory and elements from the columns of the lookup tables on a per column basis. The data can be split across the multiple lookup tables to increase a number of MAC operations performed per cycle. In some embodiments, the device can perform 128 MAC operations per cycle. For example, the device can include 128 MAC units to multiply elements from the load store memory with elements of at least one column and store the respective results. In some embodiments, the MAC units can be partitioned into multiple MAC blocks and each MAC block can multiply 16 elements from the load store memory with 16 elements from at least one column of elements of a lookup table. The number of MAC operations performed per cycle can vary and correspond to the number of lookup tables and/or number of columns in the lookup tables.

The device can perform adder functions or reduction functions on the outputs from the MAC units prior to storing in a state register of the device. For example, the device can add, combine or accumulate new or recent outputs corresponding to individual columns of each lookup table with one or more previous outputs corresponding to the respective column. In some embodiments, the previous results can be accumulated with the current or most recent results in 2*128 bit stage registers of the device configured to hold or store the outputs (e.g., intermediate output, intermediate results) corresponding to the columns of the lookup tables (e.g., hold the outputs from 8 columns of the lookup tables (8*32-bit results). The generated output for each lookup table can be stored and maintained in the state registers of the device. In some embodiments, the device can perform quantization to the output of the MAC operations prior to storing the outputs in the state registers. In embodiments, the output corresponding to each lookup table can be stored in a unique or individual state register (e.g., 32 bit state register) of the device.

Figure 2A:
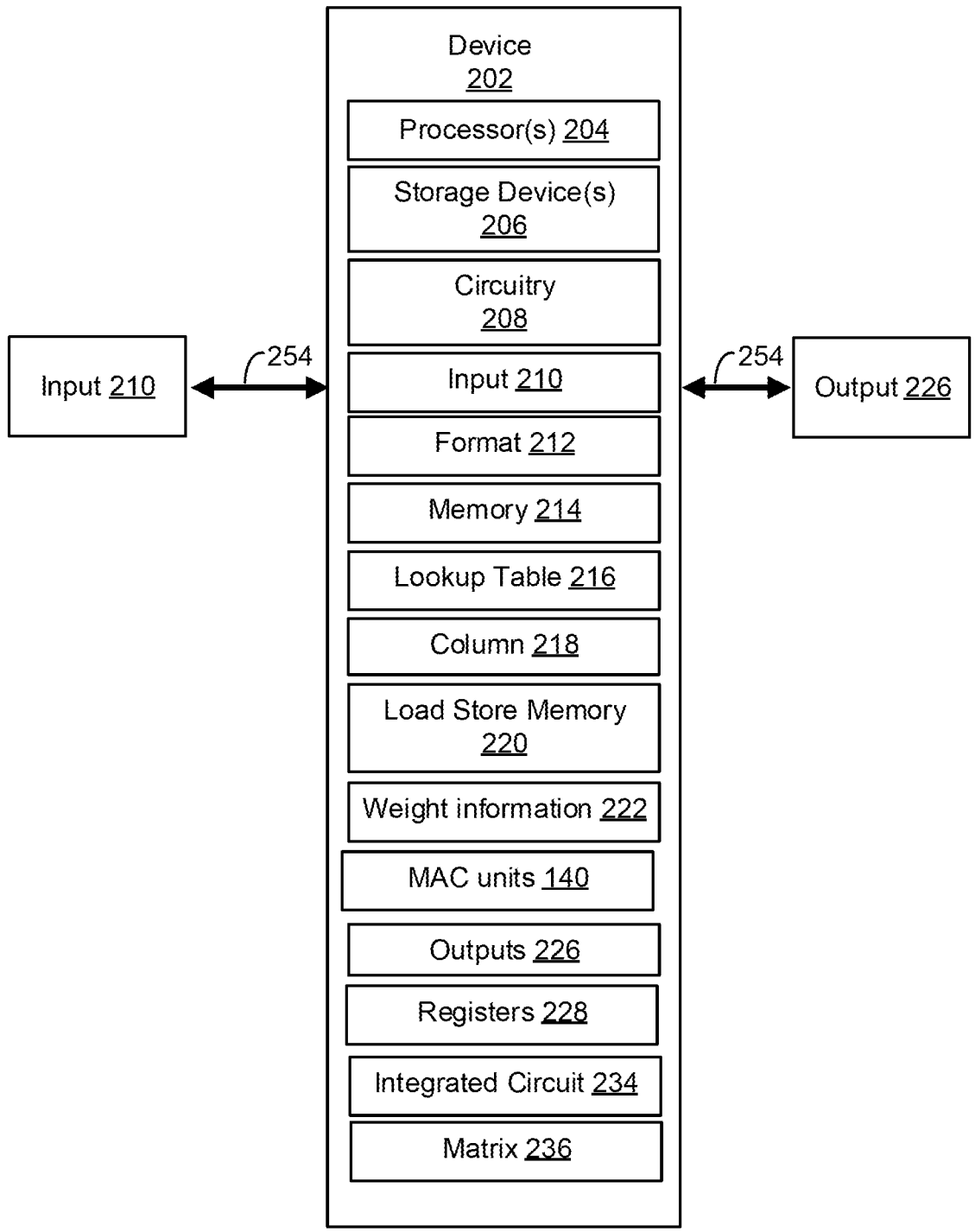
FIG. 2A is a block diagram of a system for processing and converting data using matrix operations, according to an example implementation of the present disclosure.

Referring now to FIG. 2A, a system 200 for processing and converting data using matrix operations is depicted. In brief overview, the system 200 can include a device 202 to receive an input 210 and convert the input 210 from a first data format 212 to a second different data format 212 using matric operations, for example, for text to speech conversion or speech to text conversion. The device 202 can include a plurality of memory 214 having lookup tables 216 to partition the input 210 across columns 218 of the respective lookup tables 216. For example, a circuitry 208 of the device can partition, split up or spread portions of the input 210 across the columns 218 of the lookup tables 216 to write the input 210 in different locations and increase a speed of processing the respective input 210. The circuitry 208 (or processor 204) can tune, manage and/or increase the speed of processing the received input 210 and performing the MAC operations using the number of columns 218. The number of MAC operations per cycle can vary and be selected based in part on the partitioned input 210 (e.g., size of input, type of data) and the number of columns 218 used to partition the input 210.

The device 202 can include a processor 204. The processor can be the same as or similar to processor(s) 124 described above with respect to FIG. 1A. The device 202 can include a storage device 206. The storage device 206 can include a static random access memory (SRAM) or any other types of memory, storage drive or storage register. In some embodiments, the storage device 206 can include, be the same as or substantially similar to storage device 126 of FIGS. 1A-1B or storage 158 of FIG. 1D. The device 202 can include circuitry 208. The circuitry 208 can be a component of or part of computing system 150 described above with respect to FIG. 1D. In embodiments, the circuitry 208 can include a processor to perform all of or parts of method 300 described below with respect to FIG. 3.

The input 210 can include data, a plurality of data values or a stream of data values (e.g., continuous stream) The input 210 can include, but not limited to, text data, speech data, image data or video data. The input 210 can be received in a first data format 212 or original data format 212. The data format 212 can include, but not limited to, text, audio, image or video. In some embodiments, the input 210 can include, be the same as or substantially similar to input data 110 of FIG. 1A.

The device 202 can include a plurality of memory 214. In embodiments, the size of the individual memory 214 can range from 2 KB to 4 KB. The size of the individual memory 214 can vary within or outside this range. The memory 214 can include a bus 254 having a varying width (e.g., 128 bit bus width) and the width can be selected based in part on the size of lookup tables 216 and columns 218 forming he respective memory 214. In embodiment, the memory 214 can include an interface (e.g., 32 bit interface) to receive an input 210 and/or connect with a processor 204 or circuitry 208 of the device 202. The memory 214 can include static random access memory (SRAM) or any other types of memory, storage drive or storage register. In some embodiments, the memory 214 can include, be the same as or substantially similar to storage device 126 of FIGS. 1A-1B or storage 158 of FIG. 1D. In embodiments, the device 202 can include four memory 214 with the memory 214 each having at least one lookup table 216. The number of memory 214 can vary.

The lookup tables 216 can include a data structure, an array, or matrix of data values for writing, storing and/or reading elements from the respective lookup tables 216. In embodiments, the size of the lookup tables 216 can range from 2 KB to 4 KB. The size of the lookup tables 216 can vary within or outside this range. The lookup tables 216 can include a bus 254 having a varying width (e.g., 128 bit bus width) and the width can be selected based in part on the size of the respective lookup tables 216 and columns 218 forming he respective lookup table 216. In some embodiments, a bus width of the bus 254 of the columns 218 of the lookup tables 216 load can be a function of a number of elements (e.g., 16 elements) maintained in a row of the respective column 218 and a number of bits (e.g., 8 bits) of each element. In embodiments, the lookup table 216 can include an interface (e.g., 32 bit interface) to receive an input 210 and/or connect with a processor 204 or circuitry 208 of the device 202. The lookup tables 216 can include one or more rows 256 and one or more columns 218 (e.g., two columns per lookup table) to store and maintain portions of a received input 210. For example, the device 202 can partition the input 210 across the columns 218 of the lookup tables 216. The number of rows 256 and/or number of columns 218 per lookup table 216 can vary. In some embodiments, the rows 256 of a lookup table can hold or store 32 bits of data with 16 bits stored in a row of an individual column 218 (e.g., two columns 218). In embodiments, the device 202 can retrieve or access a row of a column 218 at a time to perform matrix operations.

The device 202 can include a load store memory 220. The load store memory 220 can include or correspond to a tightly coupled memory (TCM). For example, the load store memory 220 can include a digital signal processor (DSP) data TCM. The load store memory 220 can vary in size and the size of the load store memory 220 can be selected based in part on an amount of data or weight information 222 to be stored in the load store memory 220. The load store memory 220 can include a bus 254 having a varying width (e.g., 128 bit bus width). In some embodiments, a bus width of the bus 254 of the load store memory 220 can be a function of a number of elements (e.g., 16 elements) maintained in the load store memory 220 and a number of bits (e.g., 8 bits) of each element. In embodiments, the bus width of the bus 254 of the load store memory 220 can be a function of a number of elements (e.g., 16 elements) maintained in a row of the load store memory 220 and a number of bits (e.g., 8 bits) of each element. The width of the bus 254 can be selected based in part on the size of the load store memory 220. In embodiments, the load store memory 220 can include static random access memory (SRAM) or any other types of memory, storage drive or storage register. In some embodiments, the load store memory 220 can include, be the same as or substantially similar to storage device 126 of FIGS. 1A-1B or storage 158 of FIG. 1D.

The load store memory 220 can store and maintained weight information 222. The weight information 222 can include or correspond to elements or data stored and maintained in load store memory 220. The weight information 222 can include weighted data, activation data, refined or updated data (e.g., weight information and/or bias information, activation function information) for one or more neurons (or nodes) and/or layers of a neural network(s) (e.g., neural network 114). The weight information 222 can include weights provided through or in a weight stream and provided to the load store memory 220 of the device 202. In some embodiments, the weight information 222 can include, be the same as or substantially similar to any weights described herein or weights 134 of FIG. 1B.

The device 202 can include one or more registers 228 (e.g., 2-128 bit registers). The registers 228 can include memory, storage or a process register to server a holding place or to store one or more elements (e.g., outputs 226) during processing of the respective data. The registers 228 can be partitioned into multiple portions. In embodiments, the portions 258 can be the same size. For example, in one embodiment, the device 202 can include two 128 bit registers and each of the registers 228 can include four portions 258 with each portion corresponding to a 32 bit portion. A size of the registers 228 and/or a size of the portions 258 of the registers 228 can vary and be selected based at least in part on the properties (e.g., size, amount) of the outputs 226. The device 202 can assign or allocate the portions to outputs 226 of individual columns 218. For example, the outputs 226 associated with the same column 218 can be stored in the same register 228 and/or portion of the register 228.

The device 202 can include an integrated circuit 234. The integrated circuit 234 can be a component of or part of computing system 150 described above with respect to FIG. 1D. In embodiments, the integrated circuit 234 can include a processor and be configured to perform all of or parts of method 300 described below with respect to FIG. 3. In some embodiments, the load store memory 220, the plurality of memory 214, the processor 204 and the circuitry 208 can reside within the integrated circuit 234.

Figure 2B:
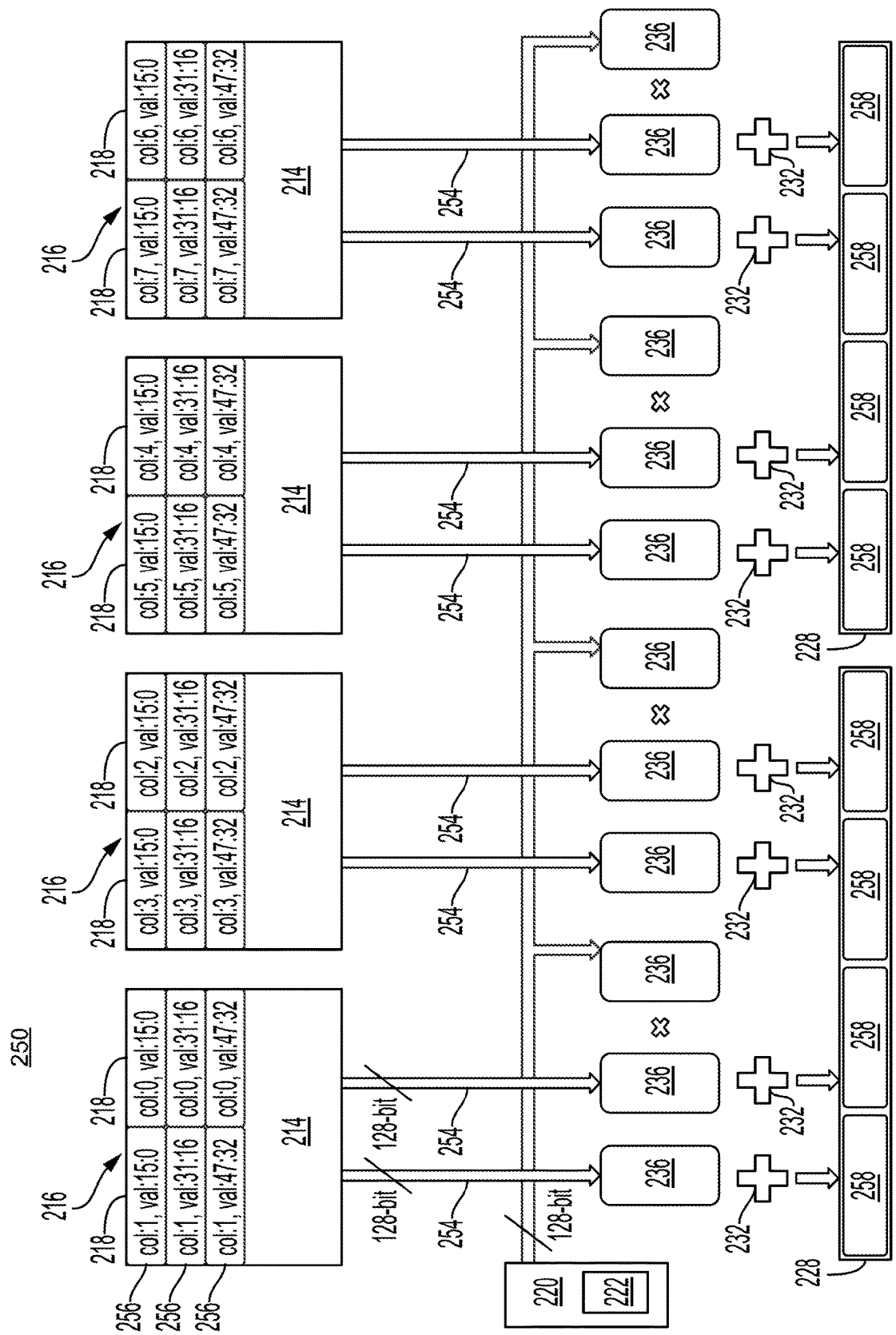
FIG. 2B is a block diagram of a system multiple lookup table memory connected to a load store memory to perform matrix operations, according to an example implementation of the present disclosure.

Now referring to FIG. 2B, a system 250 (e.g., integrated circuit 250) having a load store memory 220 connected to a plurality of memory 214, each having a lookup table 216 is provided. The system 250 can include or correspond to an integrated circuit 234 of device 202. In embodiments, the system 250 can convert a received input 210 from a first data format 212 to a second different data format 212, for example, for text to speech conversion or speech to text conversion.

The system 250 can include a load store memory 220 to store and maintain weight information 222. In embodiments, the load store memory 220 can include or correspond to a digital signal processor (DSP) data tightly coupled memory (DTCM) of the device 202. The system 250 can include a plurality of memory 214 each having a lookup table 216 and the lookup tables 216 can include one or more columns 218 (e.g., two columns 218) of data or elements. For example, an input 210 (e.g., text input, speech input) received by the device 202 can be partitioned across the different lookup tables 216 such that different portions of the partitioned input 210 are stored to different columns 218 of the respective lookup tables 216.

In embodiments, a bus 254 of the load store memory 220 can be connected in parallel to a bus 254 of each of the lookup tables 216, for example, to perform matrix operations. The bus 254 of the load store memory 220 can provide weight information 222 and the bus 254 of the lookup tables 216 can provide the partitioned input 210 from individual columns 218 of the respective lookup tables 216. The load store memory 220 and lookup tables 216 of each of the memory 214 can be connected in parallel such that the processor 204 can access or retrieve the partitioned input 210 on a per column basis. For example, the processor 204 (or circuitry 208) of the device 202 can retrieve or access partitioned input 210 from the columns 218 of the respective lookup tables 216 and retrieve or access weight information 222 from the load store memory 220 via the load store bus 254 to perform matrix multiply between the partitioned input 210 and the weight information 222. The processor 204 (or circuitry 208) of the device 202 can retrieve or access partitioned input 210 from the columns 218 on a per column basis or from multiple columns 218 (e.g., two columns at a time, four columns at a time) from the respective lookup tables 216 and retrieve or access weight information 222 from the load store memory 220 via the load store bus 254. In embodiments, the partitioned input 210 and the weight information 222 can be provided to MAC units 140 of the device 202 to perform the matrix multiply between the partitioned input 210 and the weight information 222.

In embodiments, the processor 204 can generate matrix 236 of values using the weight information 222 and partitioned input 210. For example, the processor 204 can generate a first matrix 236 that includes the weight information 222 from the load store memory 220 and a second matrix 236 that includes the partitioned input 210 from the columns 218 of the lookup tables 216. The processor 204 and/or MAC units 140 can perform matrix multiply operations between portions of the first matrix 236 and the second matrix 236. For example, the processor 204 can multiple elements from the first matrix 236 corresponding to the weight information 222 from the load store memory 220 with elements from the second matrix 236 corresponding to partitioned input 210 from a single column 218 of a lookup table 216.

The processor 204 and MAC units 140 can perform a number of MAC operations per cycle between the weight information 222 and the partitioned input 210 read on a per column basis from the plurality of lookup tables 216 based in part on the total number of columns 218 of the plurality of lookup tables 216 of the plurality of memory 214. The number of MAC operations per cycle can vary and be selected based in part on the partitioned input 210 (e.g., size of input, type of data) and the number of columns 218 used to partition the input 210. The processor 204 can tune, manage and/or increase the speed of processing a received input 210 and performing the MAC operations using the number of columns 218. The number of MAC operations per cycle can vary and be selected based in part on the partitioned input 210 (e.g., size of input, type of data) and the number of columns 218 used to partition the input 210.

The processor 204 and/or MAC units 140 can generate a plurality of outputs 226. The plurality of outputs 226 can include or correspond to outputs of the MAC units 140 and the MAC operations performed by the MAC units 140. The outputs 226 can correspond to outputs 226 of individual columns 218 of the lookup tables 216. In embodiments, the processor 204 can perform an adder function on the outputs 226 to generate outputs 226 of any size based in part on a size of a register 228 the respective outputs 226 are to be stored.

The processor 204, responsive to the adder function, can accumulate the outputs 226 in a register 228 with one or more previous outputs 226 associated with the same column 218. For example, the processor 204 can combine or accumulate recent outputs 226 with previous outputs 226 in one or more registers 228 of the device 202. The processor 204 can combine or accumulate recent generated outputs 226 for a column 218 with one or more previous outputs 226 for the same column 218 in a common register 228 of the device 202 or prior to storing in the register 228. The processor 204 can write or store the accumulated output 226 to registers 228 or portions 258 of registers 228 of the device 202. The device 202 or circuitry 208 can assign or allocate a register 228 or a portion of a register 228 to each column 218 of the lookup tables 216. The processor 204 can write or store the outputs 226 associated with same column 218 to the same register 228 or same portion 258 of the register 228.

Figure 3:
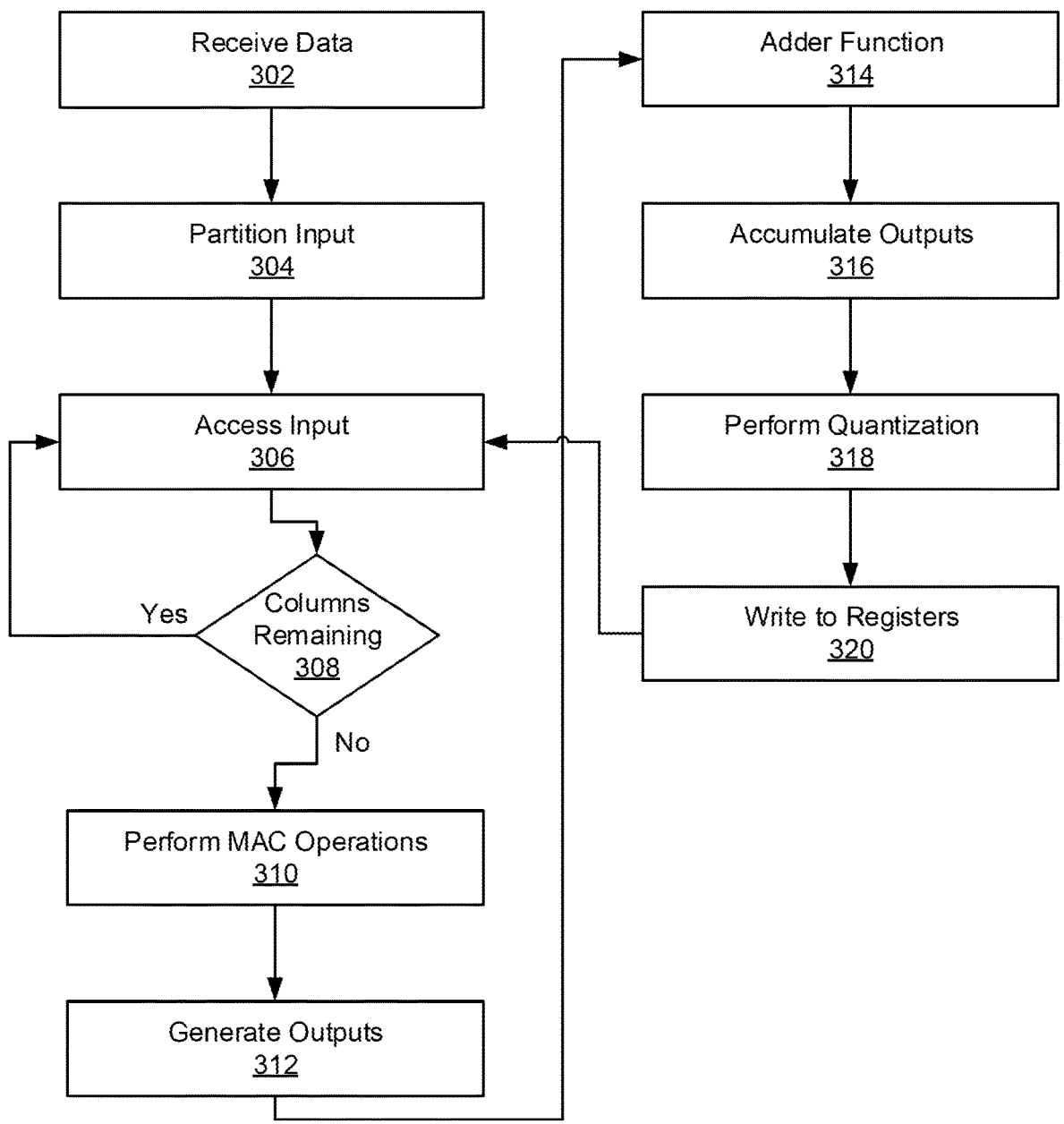
FIG. 3 is a flow chart illustrating a process or method for processing and converting data using matrix operations, according to an example implementation of the present disclosure.

Now referring to FIG. 3, a method 300 for processing and converting data (e.g., speech to text conversion) using matrix operations is provided. In brief overview, the method 300 can include receiving a data (302), partitioning an input (304), accessing the input (306), determining if there are any remaining columns (308), performing MAC operations (310), generating outputs (312), performing an adder function (314), accumulating the outputs (316), performing quantization (318), and writing to registers (320). One or more of these operations may be performed by at least one processor and/or circuitry (e.g., processor 204, circuitry 208).

At operation 302, and in some embodiments, data 210 can be received (e.g., by circuitry 208). The data can include, but be not limited to, text data, speech data, image data or video data. In some embodiments, the data can include or correspond to an unprocessed or original form an input 210. The input 210 can be received in a first data format 212 or original data format 212. The format 212 can include at least one of: text, audio, image or video. In some embodiments, the data can be received in vector form or in matrix form (e.g., input matrix). In some embodiments, the circuitry 208 can preprocess the input 210. For example, the circuitry 208 can preprocess the data 210 into vector form prior to partitioning the input 210. In some embodiments, the preprocessed first data 210 can be the input 210.

At operation 304, and in some embodiments, the input 210 can be partitioned. The circuitry 208 can partition the input 210 of a first data format 212 across a plurality of lookup tables 216 each residing in a respective memory 214. The circuitry 208 can partition the input 210 such that portions of the input 210 are written to or stored in different columns 218 of lookup tables 216 of the different memory 214. The device 202 can include a plurality of memory 214. Each memory 214 can include at least one lookup table 216 having one or more columns 218. In some embodiments, a memory 214 can include two columns 218 for storing and maintaining data (e.g., input 210). The circuitry 208 can partition, split up or spread portions of the input 210 across the columns 218 of the lookup tables 216 to write the input 210 in different locations and increase a speed of processing the respective input 210. For example, the speed of processing the input 210 can correspond to the number of columns 218 and/or lookup tables 216 used to partition the input 210.

In some embodiments, the input 210 can be received in vector form or as one or more input matrix 236. For example, the circuitry 208 can receive a first input matrix 236 and a second input matrix 236. The first input matrix 236 can be written to or loaded in to a load store memory 220 of the device 202. The second input matrix 236 can be partitioned or loaded across different lookup tables 216 of a plurality of memory 214 of the device 202. In one embodiment, eight columns of data from the second input matrix 236 can be written to or loaded into eight columns 218 of four lookup tables 216 (e.g., two columns in each lookup table) of four memory 214.

In some embodiments, one input matrix 236 (e.g., smaller matrix) can include or correspond to activations and one input matrix 236 (e.g., larger matrix) can include or correspond to weights. A matrix multiply can be performed between activation input matrix 236 and the weights input matrix 236. In embodiments, the weight input matrix 236 can be larger or include more elements and be stored in the load store memory 220 and the activations input matrix 236 can be smaller or include less elements and be stored in the lookup tables 216. In some embodiments, the activations can include or correspond to inputs generated from voice data (e.g., through a microphone) or outputs of one or more previous layers. The weights can include or correspond to constants generated for an application (e.g., on-device application). In one embodiment, the first input matrix 236 can be generated at runtime, for example, using voice input and the second input matrix 236 can include constants assigned to or generated for the particular application (e.g., for device 202 and stored in memory 214).

In embodiments, the circuitry 208 can partition the input 210 into individual bit elements, bits of data or a byte of data. The circuitry 208 can partition or spread the input 210 across the columns 218 and lookup tables 216 in a determined order, sequential order or randomly. The circuitry 208 can write or store a received input 210 to columns 218 of the memory 214 such that the columns 218 receive the same size portion of the input 210 (e.g., same number of bits, same number of bytes). The size of the columns 218 and lookup tables 216 can vary and can be selected based at least in part on a size of an input 210 and/or a type of data being processed.

In some embodiments, the circuitry 208 can write or store a received input 210 to columns 218 of the memory 214 in sequential order or as the respective input 210 is received. For example, the input 210 can include a series of data values, continuous data stream or a stream of data and the circuitry 208 can partition the input 210 into bits of data or bytes and write or store partitioned input 210 to columns 218 of the memory 214 in a sequential order corresponding to when the respective portion of the input 210 is received. In some embodiments, the circuitry 208 can write or store a first portion of the input 210 to a first column 218 of a first lookup table 216, a second portion of the input 210 to a second column 218 of the first lookup table 216, a third portion of the input 210 to a first column 218 of a second lookup table 216, and a fourth portion of the input 210 to a second column 218 of the second lookup table 216.

At operation 306, and in some embodiments, the input 210 can be accessed. The circuitry 208 can access or read weight information 222 from a load store memory 220 and the partitioned input 210 on a per column basis from the plurality of lookup tables 216. The circuitry 208 can access, retrieve or read a determined amount of weight information 222 (e.g., elements) and partitioned input 210 from one or more columns 218 of the lookup tables 216 to generate a matrix 236 of values, for example, a first matrix 236 (e.g., A matrix) and a second matrix (e.g., B matrix). In some embodiments, the first matrix 236 can include the weight information 222 from the load store memory 220 and the second matrix 236 can include the partitioned input 210 from the columns 218 of the lookup tables 216.

The circuitry 208 can access or read elements from a load store memory 220 of the device 202. The elements can include or correspond to weight information 222. For example, the weight information 222 can include weighted values of the input 210 or weighted values of an input matrix 236. In some embodiments, the circuitry 208 can access 16 8-bit elements that include weight information 222 from the load store memory 220 and generate a first matrix 236 that includes the 16 8-bit elements (e.g., weight information 222) from the load store memory 220.

The circuitry 208 can access, retrieve or fetch the partitioned input 210 from the columns 218 on a per column basis or in a determined order. The circuitry 208 can access or read elements (e.g., partitioned input 210) from one or more columns 218 of multiple lookup tables 216 and generate a second matrix 236 in a determined order such that the circuitry 208 accesses partitioned input 210 from one or more of the columns 218 of the lookup tables 216 prior to accessing partitioned input 210 from one or more other columns 218 of the lookup tables 216. The circuitry 208 can access, retrieve or fetch the partitioned input 210 from the columns 218 individually or one column at a time. In some embodiments, the circuitry 208 can access, retrieve or fetch the partitioned input 210 from the multiple columns 218 at a time. For example, the circuitry 208 can access, retrieve or read partitioned input 210 from a first column 218 and a second column 218 of a first lookup table 216 of a first memory 214 and partitioned input 210 from a first column 218 and a second column 218 of a second lookup table 216 of a second memory 214. In some embodiments, the circuitry 208 can access 16 8-bit elements of the partitioned input 210 from each column 218 of the lookup tables. In one embodiment, the circuitry 208 can read one row of weight information 222 (e.g., elements, 16 elements) from the load store memory 220 and, in parallel, read one entry or column 218 of data from the lookup tables 216 on a per column basis.

At operation 308, and in some embodiments, a determination can be made to access a next or subsequent column 218 or if each column 218 has been accessed. The circuitry 208 can determine if there are any remaining columns 218 to access or if the partitioned input 210 has been accessed from each of the columns 218 of the lookup tables 216 of the plurality of memory 214. In some embodiments, the circuitry 208 can include a counter and can increment the counter after each access or retrieval of the partitioned input 210 from a column 218. The circuitry 208 can compare the counter value to a threshold (e.g., threshold equal to the total number of columns 218). If the counter value is less than the threshold, the circuitry 208 can determine that one or more columns 218 have unassessed data and return to (308) to access a subsequent column 218. The circuitry 208 can continue to access, retrieve or read partitioned input 210 from a next or subsequent column 218 until the circuitry 208 has accessed, retrieved or read partitioned input 210 from each of the columns 218 or a determined number of columns 218. If the counter value is equal to the threshold, the circuitry 208 can determine that each of the columns 218 have been accessed and move to (312) to perform multiply-accumulate (MAC) operations.

At operation 310, and in some embodiments, MAC operations can be performed. The circuitry 208 can perform a number of MAC operations per cycle between the weight information 222 from the load store memory 220 and the partitioned input 210 read on a per column basis from the plurality of lookup tables 216. The number of MAC operations performed per cycle can correspond to a total number of columns 218 of the plurality of lookup tables 216 of the plurality of memory 214. In some embodiments, per cycle can include or refer to per clock cycle, instructions per clock, and/or a number of instructions executed for each clock cycle. The circuitry 208 can perform the MAC operations between the weight information 222 from the load store memory 220 and the partitioned input 210 read on a per column basis from the plurality of lookup tables 216. For example, the circuitry 208 can perform matrix multiplication using the weight information 222 from the load store memory 220 and the partitioned input 210 read from individual columns 218 of the plurality of lookup tables 216. In some embodiments, the circuitry 208 can access the first matrix 236 having the weight information 222 from the load store memory 220 and the second matrix 236 having the portioned input 210 from each of the columns 218 to perform matrix multiply operations between the first matrix 236 and the second matrix 236.

The circuitry 208 can include a plurality of MAC units 140. The MAC units 140 can perform matrix multiply operations between portions of the first matrix 236 and the second matrix 236. The MAC units 140 can multiply elements from the first matrix 236 with a column 218 of elements from the second matrix 236. For example, the MAC units 140 can multiple elements from the first matrix 236 corresponding to the weight information 222 from the load store memory 220 with elements from the second matrix 236 corresponding to partitioned input 210 from a single column 218 of a lookup table 216. The number of MAC units 140 can vary and be selected based in part on a number of MAC operations to be performed per cycle (e.g., 1 MAC unit 140 per MAC operation). In some embodiments, the circuitry 208 can include 128 MAC units 140 to perform 128 MAC operations between the weight information 222 from the load store memory 220 and the partitioned input 210 read on a per column basis from the plurality of lookup tables 216. The MAC units 140 can be partitioned or divided into MAC blocks. In some embodiments, the MAC units 140 can be partitioned or divided into 8*16 MAC blocks and each 16-MAC block can multiple elements (e.g., 16 elements) from the first matrix 236 with a column 218 of elements (e.g., 16 elements) from the second matrix 236. In one embodiment, the circuitry 208 can multiple 16 elements of the first matrix 236 (e.g., weight information 222 from load store memory 220) with 16 elements from each of the columns 218 (e.g., eight columns 218) of the second matrix 236 (e.g., partitioned input 210 from each of the columns 218 of the lookup tables 216). In some embodiments, the results of the MAC operations can include or correspond to temporary outputs or temporary results still to undergo further processing (e.g., adder function, quantization) prior to storing in a register 228.

The device 202 can tune, manage and/or increase the speed of processing a received input 210 and performing the MAC operations using the number of columns 218. The device 202 or circuitry 208 can select a number of columns 218 and/or lookup tables 216 to partition the received input 210 across to determine or select the number of MAC operations performed per cycle. In some embodiments, the number of MAC operations performed per cycle can be equal to a product of the total number of columns 218 of the plurality of lookup tables 216 and a number of elements (e.g., weight information 222) maintained in the load store memory 220. The device 202 can increase or decrease a number of columns 218 to use for a subsequent input 210 to tune or modify the speed of processing a received input 210 and performing the MAC operations using the number of columns 218.

At operation 312, and in some embodiments, an output 226 can be generated. The circuitry 208 can generate, responsive to the MAC operations on the partitioned input 210, a plurality of outputs 226 in a second data format 212. The plurality of outputs 226 can include or correspond to outputs of the MAC units 140 and the MAC operations performed by the MAC units 140. The circuitry 208 can generate the plurality of outputs 226 in vector form. The second data format 212 can be different from the first data format 212. For example, in some embodiments, if the received input 210 is in a text format 212, the plurality of output 226 can be in a speech format 212. In some embodiments, if the received input 210 is in a speech format 212, the plurality of output 226 can be in a text or written format 212. The plurality of outputs 226 can include or correspond to an intermediate output to be processed further by the circuitry 208 prior to a final form (e.g., third data format).

At operation 314, and in some embodiments, an adder function can be performed. The circuitry 208 can perform an adder function (e.g., adder tree/reduction) to outputs 226 corresponding to the columns 218 to generate outputs 226 of a determined size (e.g., determined bit size, 32-bit results). In embodiments, the adder function can include an adder tree or a reduction tree that adds values in parallel and generates outputs 226. For example, in one embodiment, the adder function can include a reduction tree that adds 16 values in parallel and generates a 32-bit output. The number of outputs 226 generated can vary and be based in part on the number of columns 218 and/or the number of values processed. For example, to generate two outputs 226, the adder function can add the first 8 values to generate a first output 226 and add a second 8 values to generate a second output 226. The circuitry 208 can perform the adder function to generate two outputs 226 by adding a first 8 values to generate a first output 226 and adding a second 8 values to generate a second output 226. The circuitry 208 can perform the adder function to generate four outputs 226 by adding sets of 4 values to generate four different outputs 226 (e.g., each output produced from one set of 4 values). The circuitry 208 can perform the adder function to generate eight outputs 226 by adding sets of 2 values to generate eight different outputs 226 (e.g., each output produced from one set of 2 values). The circuitry 208 can perform the adder function to generate sixteen outputs 226 by forwarding each input (e.g., 16 inputs) to a respective output 226 to generate sixteen different outputs 226 (e.g., each output corresponding to one input value).

The circuitry 208 can perform the adder function to generate outputs 226 of any size based in part on a size of a register 228 the respective outputs 226 are to be stored. The circuitry 208 can obtain the outputs 226 corresponding to the individual columns 218 of the lookup tables 216. For example, the circuitry 208 can maintain or organize the outputs 226 based in part on the respective column 218 the outputs 226 were generated from such that outputs 2226 corresponding to the same column 218 are grouped together. The circuitry 208 can perform the adder function to outputs 226 of the columns 218 to generate results for each column 218 (e.g., 8 columns 218 and 8 sets of outputs 226 of a determined size). In some embodiments, the circuitry 208 can perform adder function to add outputs 226 from the MAC units 140 in a MAC block (e.g., 16 outputs from MAC units 140 in a 16-MAC block).

At operation 316, and in some embodiments, outputs 226 can be accumulated. The circuitry 208 can combine or accumulate recent outputs 226 with previous outputs 226 in one or more registers 228 of the device 202. In some embodiments, the circuitry 208 can accumulate the outputs 226 for the columns 218 using dimensionality reduction (e.g., reduction dimension (k)). The circuitry 208 can combine one or more outputs 226 associated with a column 218 a first lookup table 216 of the plurality of lookup tables 216 with one or more previous outputs 226 for the column 218 of the first lookup table 216 in a register 228. The circuitry 208 can combine or accumulate recent generated outputs 226 for a column 218 with one or more previous outputs 226 for the same column 218 in a register 228 of the device 202 or prior to storing in the register 228. In some embodiments, the circuitry 208 can combine or accumulate outputs 226 corresponding to the same column 218 or generated using partitioned input 210 from the same column 218 in the same register 228.

At operation 318, and in some embodiments, quantization can be performed. The circuitry 208 can perform quantization on the plurality of outputs 226 prior to storing the outputs 226 in the plurality of registers 228. The circuitry 208 can perform quantization on the outputs 226 to modify a size of the respective outputs 226 or modify a number of bits (e.g., reduce a number of bits) of the respective output 226 to determined size or determined number of bits. In embodiments, the circuitry 208 can include quantization components or quantization hardware to clamp the outputs 226 to generate a subsequent output 226 of a different bit value or size. In one embodiment, the circuitry 208 can perform quantization on the outputs 226 by clamping a 32-bit signed or unsigned number to a 16-bit size, 8-bit size or a determined size or determined number of bits (e.g., any custom precision format). The circuitry 208 including the quantization hardware can take multiple 32-bit numbers (e.g., 8 32-bit numbers) as inputs and scale or multiple the input numbers by a 12-bit scaling factor and right shift or divide the result by a 4-bit value or 16-bit value. In embodiments, the resulting 32-bit number can be clamped or modified to a 16-bit value, 8-bit value or a determined bit size less than 32-bit. In some embodiments, the circuitry 208 can process, after quantization, the plurality of outputs 226 to a third data format 212. The third data format 212 can be different from the original or first data format 212 that the received input 210. The third data format 212 can include, but not limited to, at least one of: text, speech, audio or video.

At operation 320, and in some embodiments, outputs 226 can be written to registers 228. The device 202 or circuitry 208 can write or store the outputs 226 to registers 228 or portions 258 of registers 228 of the device 202. The device 202 or circuitry 208 can assign or allocate a register 228 or a portion of a register 228 to each column 218 of the lookup tables 216. In some embodiments, the device 202 or circuitry 208 can assign or allocate a portion of a register 228 to each column 218 of the lookup tables 216 such that each column 218 is assigned a different portion of the register 228 or a different register 228. The circuitry 208 can write or store the outputs 226 associated with same column 218 to the same register 228 or same portion of register.

In some embodiments, the device 202 can include multiple registers 228 (e.g., 2 128 bit registers) having multiple portions 258 (e.g., 4-32 bit portions) and the circuitry 208 can write the outputs 226 to the multiple portions 258 of the multiple registers 228. For example, the circuitry 208 can write outputs 226 associated with a first column 218 of a first lookup table to a first portion of a first register 228. The circuitry 208 can write outputs 226 associated with a second column 218 of the first lookup table to a second portion of the first register 228. The circuitry 208 can write outputs 226 associated with a first column 218 of a second lookup table to a third portion of the first register 228. The circuitry 208 can write outputs 226 associated with a second column 218 of the second lookup table to a fourth portion of the first register 228. The circuitry 208 can write outputs 226 associated with a first column 218 of a third lookup table to a first portion of a second register 228. The circuitry 208 can write outputs 226 associated with a second column 218 of the third lookup table to a second portion of the second register 228. The circuitry 208 can write outputs 226 associated with a first column 218 of a fourth lookup table to a third portion of the second register 228. The circuitry 208 can write outputs 226 associated with a second column 218 of the fourth lookup table to a fourth portion of the second register 228.

In embodiments, the circuitry 208 can return to (308) access a next or subsequent row of partitioned input from the lookup tables 216 of the memory 214. For example, the circuitry 208 can access a next or subsequent row of partitioned input 210 from the columns 218 of the lookup tables and perform a next or subsequent cycle of MAC operations between the next or subsequent row of partitioned input 210 from the columns 218 the weight information 222 of the load store memory 220. In embodiments, the circuitry 208 can perform a plurality of cycles of MAC operations and each cycle can include or correspond to a different row of elements from the columns 218 of the lookup tables 216. In some embodiments, the circuitry 208 can write, load or partition a next input 210 or a next portion of input 210 across the columns 218 of the lookup tables 216 for a next or subsequent cycle of the MAC operations. The number of cycles of MAC operations can correspond to a number of rows 256 of the lookup tables 216, a size the input 210 and/or number of inputs 210 (e.g., plurality of inputs, stream of inputs).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   partitioning, by circuitry, an input of a first data format across a plurality of lookup tables each residing in a respective memory, the respective memories connected in parallel to the circuitry;
   accessing, by the circuitry, weight information from a load store memory connected to the circuitry, and the partitioned input on a per column basis from the plurality of lookup tables;
   performing, by a plurality of multiply-accumulate (MAC) units within the circuitry, a number of MAC operations per cycle between the weight information from the load store memory and the partitioned input read on a per column basis from the plurality of lookup tables, the number of MAC operations performed per cycle corresponding to a total number of columns of the plurality of lookup tables; and
   generating, by the circuitry responsive to the MAC operations on the partitioned input, a plurality of outputs in a second data format.

2. The method of claim 1, wherein the first data format includes at least one of: text, audio, image or video.

3. The method of claim 1, comprising:
writing, by the circuitry, the plurality of outputs to a plurality of registers, wherein outputs associated with each column of the plurality of lookup tables are stored in registers of the plurality of registers.

4. The method of claim 1, wherein the number of MAC operations performed per cycle is equal to a product of the total number of columns of the plurality of lookup tables and a number of elements maintained in the load store memory.

5. The method of claim 1, comprising:
performing, by the circuitry, matrix multiplication using the weight information from the load store memory and the partitioned input read from individual columns of the plurality of lookup tables.

6. The method of claim 1, comprising:
combining, by the circuitry, one or more outputs associated with a column of a first lookup table of the plurality of lookup tables, with one or more previous outputs for the column of the first lookup table in a register.

7. The method of claim 1, comprising:
performing, by the circuitry, quantization on the plurality of outputs prior to storing the outputs in a plurality of registers.

8. The method of claim 1, comprising:
preprocessing, by the circuitry, first data into vector form prior to partitioning the input, the preprocessed first data being the input.

9. The method of claim 1, wherein the load store memory, the plurality of memory and the circuitry reside within an integrated circuit.

10. The method of claim 1, comprising:
processing, by the circuitry after quantization, the plurality of outputs to a third data format, the third data format comprising at least one of: text, speech, audio or video.

11. The method of claim 1, wherein a bus width of the load store memory is a function of a number of elements maintained in the load store memory and a number of bits of each element.

12. An integrated circuit comprising:
a processor comprising a plurality of multiply-accumulate (MAC) units; a load store memory connected to the processor;
a plurality of memory each comprising a lookup table, the plurality of memory connected in parallel to the processor; and
the processor configured to:
partition an input of a first data format across a plurality of lookup tables each residing in a respective memory;
read weight information from the load store memory and the partitioned input on a per column basis from the plurality of lookup tables;
perform a number of MAC operations per cycle between the weight information from the load store memory and the partitioned input read on a per column basis from the plurality of lookup tables, the number of MAC operations performed per cycle corresponding to a total number of columns of the plurality of lookup tables; and
generate, responsive to the MAC operations on the partitioned input, a plurality of outputs in a second data format.

13. The integrated circuit of claim 12, wherein the first data format includes at least one of: text, audio, image or video.

14. The integrated circuit of claim 12, wherein the processor is further configured to:
write the plurality of outputs to a plurality of registers, wherein outputs associated with each column of the plurality of lookup tables are stored in individual registers of the plurality of registers.

15. The integrated circuit of claim 12, wherein the number of MAC operations performed per cycle is equal to a product of the total number of columns of the plurality of lookup tables and a number of elements maintained in the load store memory.

16. The integrated circuit of claim 12, wherein the processor is configured to:
perform matrix multiplication using the weight information from the load store memory and the partitioned input read from individual columns of the plurality of lookup tables.

17. The integrated circuit of claim 12, wherein the processor is further configured to:
combine one or more outputs associated with a column of a first lookup table of the plurality of lookup tables, with one or more previous outputs for the column of the first lookup table in a register.

18. The integrated circuit of claim 12, wherein the processor is further configured to:
perform quantization on the plurality of outputs prior to storing the outputs in a plurality of registers.

19. The integrated circuit of claim 12, wherein the processor is further configured to:
preprocess first data into vector form prior to partitioning the input, the preprocessed first data being the input.

20. The integrated circuit of claim 12, wherein the processor is further configured to:
process, after quantization, the plurality of outputs to a third data format, the third data format comprising at least one of: text, speech, audio or video.

* * * * *